United States Patent
Romanelli

(10) Patent No.: US 9,003,670 B2
(45) Date of Patent: Apr. 14, 2015

(54) SYSTEM AND METHOD FOR MEASURING A WORKPIECE RELATIVE TO A COMMON MEASUREMENT COORDINATE SYSTEM

(75) Inventor: James Romanelli, Colchester, CT (US)

(73) Assignee: United Technologies Corporation, Hartford, CT (US)

( * ) Notice: Subject to any disclaimer, the term of this patent is extended or adjusted under 35 U.S.C. 154(b) by 288 days.

(21) Appl. No.: 13/415,421

(22) Filed: Mar. 8, 2012

(65) Prior Publication Data

US 2013/0232803 A1 Sep. 12, 2013

(51) Int. Cl.
- *G01B 5/004* (2006.01)
- *G01B 1/00* (2006.01)
- *G01B 5/008* (2006.01)

(52) U.S. Cl.
CPC ..................... *G01B 5/008* (2013.01)

(58) Field of Classification Search
USPC .................................................. 33/503, 502
See application file for complete search history.

(56) References Cited

U.S. PATENT DOCUMENTS

| | | | |
|---|---|---|---|
| 3,389,472 A * | 6/1968 | Poland | 33/520 |
| 4,333,239 A | 6/1982 | Arrigoni | |
| 5,396,712 A * | 3/1995 | Herzog | 33/503 |
| 7,036,236 B1 | 5/2006 | Drescher et al. | |
| 7,206,080 B2 | 4/2007 | Kochi et al. | |
| 7,246,448 B2 * | 7/2007 | Lotze | 33/559 |
| 7,573,586 B1 | 8/2009 | Boyer et al. | |
| 7,633,046 B2 | 12/2009 | Spalding | |
| 7,720,649 B2 | 5/2010 | Pickens | |
| 7,905,031 B1 * | 3/2011 | Paulino | 33/553 |
| 2001/0013927 A1 * | 8/2001 | Itoh et al. | 355/53 |
| 2005/0171707 A1 * | 8/2005 | Easley et al. | 702/40 |
| 2007/0177716 A1 * | 8/2007 | Georgi et al. | 378/210 |
| 2009/0033947 A1 | 2/2009 | Boyer et al. | |
| 2009/0089020 A1 | 4/2009 | Boyer et al. | |
| 2009/0096148 A1 * | 4/2009 | Usui | 269/45 |
| 2009/0144980 A1 * | 6/2009 | Rangarajan et al. | 29/889.1 |
| 2009/0299687 A1 | 12/2009 | Brooks et al. | |
| 2009/0299690 A1 | 12/2009 | Joyner et al. | |
| 2010/0272348 A1 * | 10/2010 | Pulla et al. | 382/154 |
| 2011/0267451 A1 | 11/2011 | Drescher et al. | |

FOREIGN PATENT DOCUMENTS

| | | |
|---|---|---|
| JP | 05-026639 | 2/1993 |
| JP | 2001-255138 | 9/2001 |
| JP | 2004-271437 | 9/2004 |
| JP | 2004-239747 | 10/2004 |

OTHER PUBLICATIONS

International search report for PCT/US2013/029936 dated Jun. 21, 2013.

* cited by examiner

*Primary Examiner* — Peter Macchiarolo
*Assistant Examiner* — Rhyan C Lange
(74) *Attorney, Agent, or Firm* — O'Shea Getz P.C.

(57) ABSTRACT

A method for inspecting a surface geometry of a workpiece includes mounting the workpiece to a measurement artifact that includes a plurality of parametric datum features. The parametric datum features may be utilized by a first inspection device and a second inspection device to establish a measurement coordinate system. The surface geometry is measured relative to the measurement coordinate system with the first inspection device to provide first measurement data. The surface geometry is also measured relative to the measurement coordinate system with the second inspection device to provide second measurement data.

18 Claims, 3 Drawing Sheets

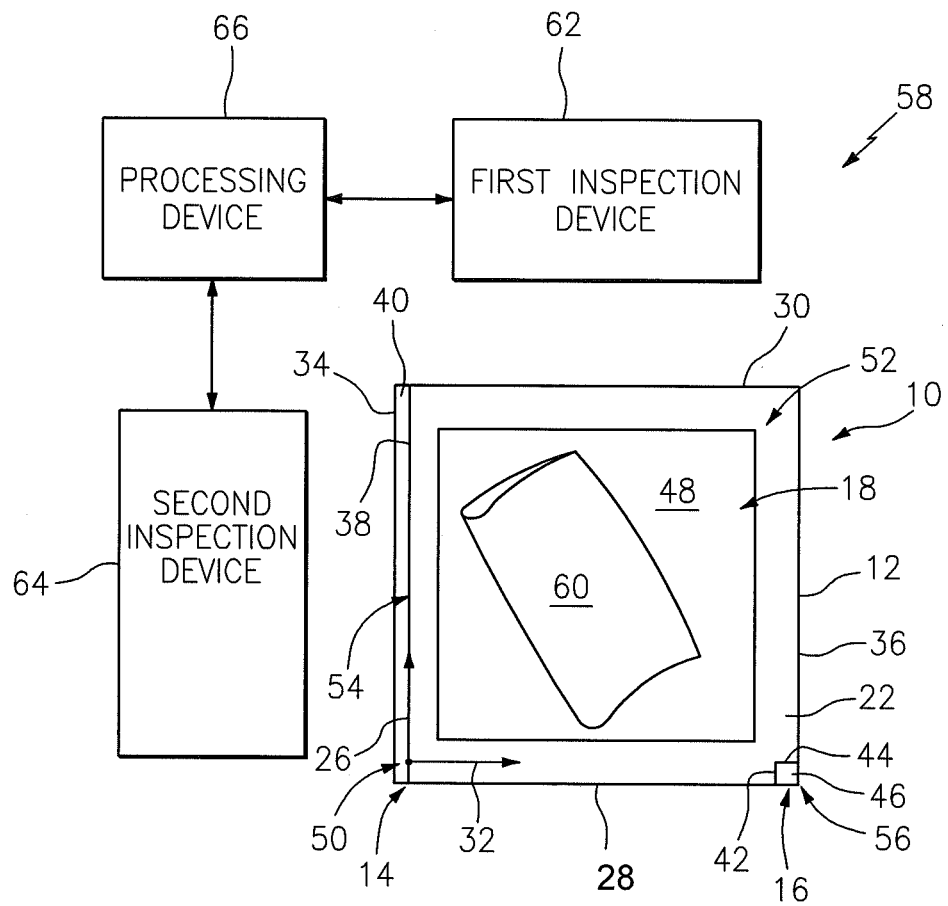
FIG. 3
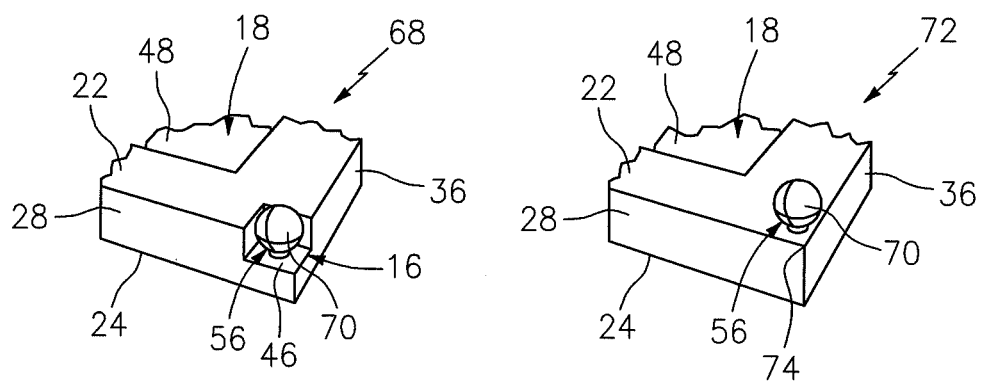
FIG. 5
FIG. 6

SYSTEM AND METHOD FOR MEASURING A WORKPIECE RELATIVE TO A COMMON MEASUREMENT COORDINATE SYSTEM

BACKGROUND OF THE INVENTION

1. Technical Field

The present invention relates generally to contact and non-contact inspection of a workpiece and, in particular, to measuring a surface geometry of a workpiece relative to a common measurement coordinate system.

2. Background Information

Various qualification methods are known for determining whether, for example, a rotor blade casting die forms a rotor blade that complies with a blade design specification. The blade design specification may include information regarding geometry and/or structural properties of the rotor blade.

A typical qualification method for a rotor blade casting die includes creating a surface geometry map of a rotor blade, formed by the die, with a plurality of inspection devices. Different inspection devices are typically utilized for the purposes of redundancy. A first surface geometry map may be created, for example, with a non-contact inspection device, and a second surface geometry map may be created with a contact inspection device. Measurement data from the first and second surface geometry maps may be respectively analyzed to determine whether measured dimensions of the rotor blade are within tolerance of the geometry designated in the blade design specification. The measurement data may be difficult to analyze, however, because each inspection device may utilize its own local coordinate system during the mappings. The measurement data from the first and second surface geometry maps therefore generally must be individually best fit to the geometry designated in the blade design specification before the tolerances are evaluated, which may introduce additional coordinate system alignment error into the evaluation.

SUMMARY OF THE DISCLOSURE

According to an aspect of the invention, a method is provided for inspecting a surface geometry of a workpiece. The method includes mounting the workpiece to a measurement artifact that includes a plurality of parametric datum features. The parametric datum features may be utilized by a first inspection device and a second inspection device to establish a common measurement coordinate system. The surface geometry is measured relative to the measurement coordinate system with the first inspection device to provide first measurement data. The surface geometry is also measured relative to the measurement coordinate system with the second inspection device to provide second measurement data.

In an embodiment, the measurement coordinate system for the measuring with the first inspection device is established by inspecting the plurality of parametric datum features with the first inspection device, and the measurement coordinate system for the measuring with the second inspection device is established by inspecting the plurality of parametric datum features with the second inspection device. In one embodiment, the inspection of the plurality of parametric datum features includes establishing a primary planar datum, a secondary line datum and a tertiary point datum, which establish the measurement coordinate system. The primary planar datum is established by inspecting a first of the plurality of parametric datum features. The secondary line datum is established by inspecting a second of the plurality of parametric datum features. The tertiary point datum is established by inspecting a third of the plurality of parametric datum features.

In an embodiment, the measurement artifact extends vertically between a planar first end surface and a second end surface, longitudinally between a first side surface and a second side surface, and laterally between a third side surface and a fourth side surface. The first end surface is the first of the plurality of parametric datum features.

In an embodiment, the measurement artifact also includes a slot that extends longitudinally between the first side surface and the second side surface. The slot includes a planar first slot surface that extends vertically from a second slot surface to the first end surface. The second slot surface extends laterally from the first slot surface to the third side surface. The first slot surface is a second of the plurality of parametric datum features. In one embodiment, the measurement artifact also includes a notch having a first notch surface, a second notch surface and a third notch surface. The notch surface extends vertically from the first end surface to the third notch surface, and longitudinally from the first side surface to the second notch surface. The second notch surface extends vertically from the first end surface to the third notch surface, and laterally from the fourth side surface to the first notch surface. The third notch surface extends longitudinally from the first side surface to the second notch surface, and laterally from the fourth side surface to the first notch surface. The notch is a third of the plurality of parametric datum features. In another embodiment, the measurement artifact also includes a substantially spherical body located adjacent a corner between the first side surface and the fourth side surface. The spherical body is a third of the plurality of parametric datum features.

In an embodiment, the measurement artifact also includes a pocket that extends vertically into the first end surface to a planar workpiece mounting surface.

In an embodiment, the first measurement data and the second measurement data are transformed from the measurement coordinate system into a reference coordinate system to respectively provide first transformed measurement data and second transformed measurement data. The first transformed measurement data and the second transformed measurement data are compared to the workpiece reference data. In one embodiment, the first measurement data is compared with the workpiece reference data to provide a transform matrix, wherein the first measurement data is processed with the transform matrix to provide the first transformed measurement data. In one embodiment, the first measurement data is compared with the workpiece reference data using a best fit analysis. In another embodiment, the second measurement data is processed with the transform matrix to provide the second transformed measurement data.

In an embodiment, the first measurement data is compared with the workpiece reference data to provide a transform matrix, wherein the second inspection device measures the surface geometry utilizing the transform matrix.

In an embodiment, the first inspection device is an optical white light scanning device, and the second inspection device is a coordinate measuring machine.

According to another aspect of the invention, a measurement artifact is provided for establishing a measurement coordinate system during inspection of a workpiece. The measurement artifact includes a measurement artifact plate, a slot and a notch. The measurement artifact plate extends vertically between a planar first end surface and a second end surface, longitudinally between a first side surface and a second side surface, and laterally between a third side surface and a fourth side surface. The slot extends longitudinally through the artifact plate between the first side surface and the second side surface. The slot includes a planar first slot surface that extends vertically from a second slot surface to the first end surface. The second slot surface extends laterally from the first slot surface to the third side surface. The notch includes a first notch surface that extends longitudinally from the first side surface to a second notch surface and vertically from the first end surface to a third notch surface. The second notch surface extends laterally from the fourth side surface to the first notch surface and vertically from the first end surface to the third notch surface. The third notch surface extends longitudinally from the first side surface to the second notch surface and laterally from the fourth side surface to the first notch surface.

In an embodiment, the first end surface establishes a primary planar datum, the first slot surface establishes a secondary line datum, and the notch establishes a tertiary point datum. The primary planar datum, the secondary line datum and the tertiary point datum establish the measurement coordinate system.

In an embodiment, the measurement artifact also includes a pocket that extends vertically into the artifact plate from the first end surface to a planar workpiece mounting surface.

In an embodiment, the measurement artifact also includes a substantially spherical body connected to the third notch surface.

According to yet another aspect of the invention, another measurement artifact is provided for establishing a measurement coordinate system during inspection of a workpiece. The measurement artifact includes a measurement artifact plate, a slot and a substantially spherical body. The measurement artifact plate extends vertically between a planar first end surface and a second end surface, longitudinally between a first side surface and a second side surface, and laterally between a third side surface and a fourth side surface. The slot extends longitudinally through the artifact plate between the first side surface and the second side surface. The slot includes a planar first slot surface that extends vertically from a second slot surface to the first end surface. The second slot surface extends laterally from the first slot surface to the third side surface. The spherical body is located adjacent a corner between the first side surface and the fourth side surface. The first end surface establishes a primary planar datum, the first slot surface establishes a secondary line datum, the spherical body establishes a tertiary point datum, and the primary planar datum, the secondary line datum and the tertiary point datum may be utilized to establish the measurement coordinate system.

In an embodiment, the measurement artifact also includes a pocket that extends vertically into the first end surface to a planar workpiece mounting surface.

The foregoing features and the operation of the invention will become more apparent in light of the following description and the accompanying drawings.

BRIEF DESCRIPTION OF THE DRAWINGS

FIG. 3 is a schematic illustration of a system for inspecting the workpiece mounted to the measurement artifact illustrated in FIG. 1;

FIG. 5 is a partial perspective illustration of an alternate embodiment measurement artifact; and FIG. 6 is a partial perspective illustration of another alternate embodiment measurement artifact.

DETAILED DESCRIPTION OF THE INVENTION

Figure 1:
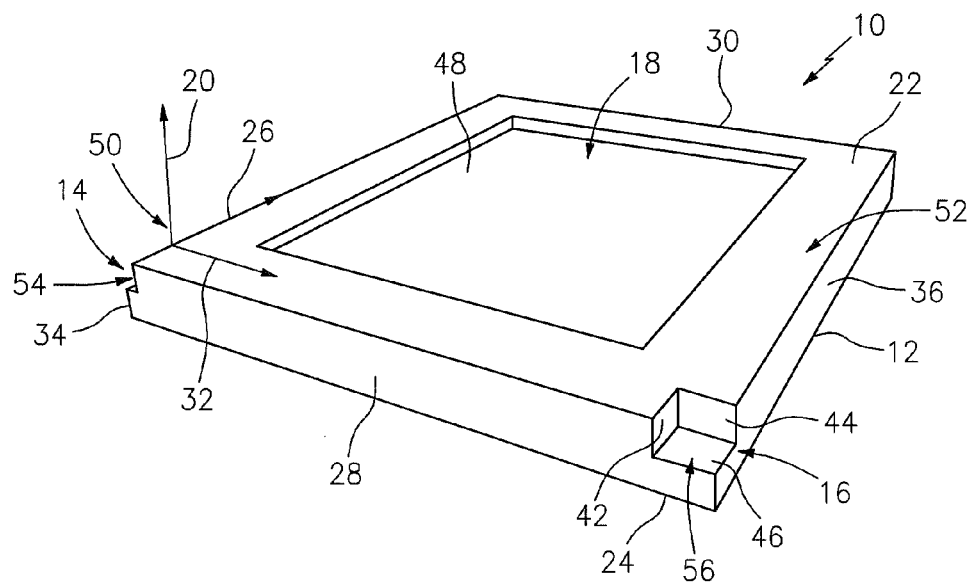
FIG. 1 is a perspective illustration of a measurement artifact for establishing a measurement coordinate system during inspection of a workpiece.
Figure 2:
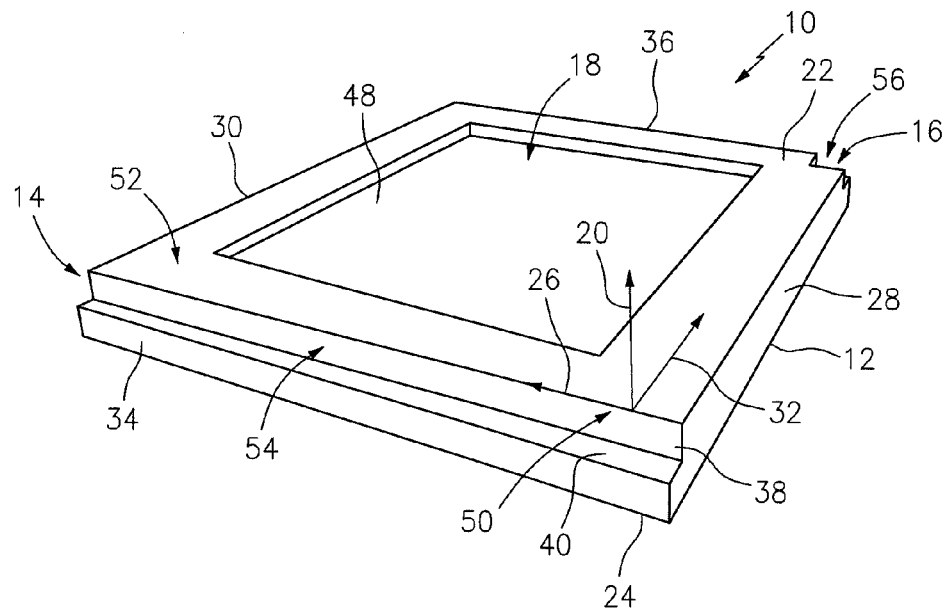
FIG. 2 is another perspective illustration of the measurement artifact illustrated in FIG. 1.

FIGS. 1 and 2 illustrate a measurement artifact 10 that includes a measurement artifact body 12 (e.g., a rectangular metal or ceramic plate), a slot 14, a notch 16 and a pocket 18. The artifact body 12 extends vertically (e.g., along an x-axis 20) between a planar first end surface 22 and a second end surface 24. The artifact body 12 extends longitudinally (e.g., along a z-axis 26) between a first side surface 28 and a second side surface 30. The artifact body 12 extends laterally (e.g., along a y-axis 32) between a third side surface 34 and a fourth side surface 36.

The slot 14 may extend longitudinally through the artifact body 12 between the first side surface 28 and the second side surface 30. The slot 14 may include a planar first slot surface 38 and a second slot surface 40. The first slot surface 38 extends vertically from the second slot surface 40 to the first end surface 22, and may be substantially perpendicular to the first end surface 22. The second slot surface 40 extends laterally from the first slot surface 38 to the third side surface 34.

The notch 16 may include a planar first notch surface 42, a planar second notch surface 44 and a planar third notch surface 46. The first notch surface 42 extends longitudinally from the first side surface 28 to the second notch surface 44, and vertically from the third notch surface 46 to the first end surface 22. The second notch surface 44 extends laterally from the fourth side surface 36 to the first notch surface 42, and vertically from the third notch surface 46 to the first end surface 22. The third notch surface 46 extends longitudinally from the first side surface 28 to the second notch surface 44, and laterally from the fourth side surface 36 to the first notch surface 42. The first notch surface 42 and the second notch surface 44 may be substantially perpendicular to one another and to the first end surface 22. The third notch surface 46 may be substantially parallel to the first end surface 22.

The pocket 18 extends vertically into the artifact body 12 from the first end surface 22 to a (e.g., planar) workpiece mounting surface 48. The workpiece mounting surface 48 may be substantially parallel to the first end surface 22, and may be perimetrically surrounded (e.g., circumscribed) by the first end surface 22.

One or more surfaces or portions of the measurement artifact 10 may be configured to form a parametric datum feature. An example of a parametric datum feature is a surface or body that (i) has a parametric geometry, and (ii) may be utilized by an inspection device (e.g., a measurement device) to establish a measurement datum. The term "parametric geometry" is used to describe a geometry that may be defined by a finite number of parameters (e.g., dimensions); such as, for example, a planar surface, a cuboid body, a spherical body, a cylindrical body, etc. A non-parametric geometry, in contrast, is a geometry that cannot be defined by a finite number of parameters; e.g., a surface that curves according to a logarithmic function, etc. Some examples of measurement datums include a primary (e.g., planar) datum, a secondary (e.g., line) datum and a tertiary (e.g., point) datum, which may be collectively utilized by the inspection device to establish a local measurement coordinate system 50.

Referring still to FIGS. 1 and 2, the measurement artifact 10 may include a plurality of parametric datum features. The first end surface 22, for example, may be configured as a primary datum feature 52 (e.g., an X datum feature). The first slot surface 38 may be configured as a secondary datum feature 54 (e.g., a Y datum feature). The notch 16 may be configured as a tertiary datum feature 56 (e.g., a Z datum feature).

FIG. 3 is a schematic illustration of a system 58 for inspecting a workpiece 60 (e.g., a turbine engine airfoil) mounted to the measurement artifact 10. The system 58 includes a first inspection device 62 (e.g., a non-contact, optical white light scanning device), a second inspection device 64 (e.g., a contact, coordinate measuring machine) and a processing device 66 (e.g., a desktop computer). An example of an optical white light scanning device is disclosed in U.S. patent application Ser. No. 11/888,006, which is hereby incorporated by reference in its entirety, and is assigned to the assignee of the present invention. Examples of a coordinate measuring machine are disclosed in U.S. Pat. No. 7,720,649 and U.S. patent application Ser. No. 11/890,704, each of which is hereby incorporated by reference in its entirety, and is assigned to the assignee of the present invention.

The processing device 66 may be implemented using hardware, software, or a combination thereof. The processing device 66 may include one or more processors, a memory, analog and/or digital circuitry, etc. The processing device 66 is in signal communication (e.g., hardwired or wirelessly connected) with the first inspection device 62 and the second inspection device 64. Alternatively, the processing device 66 may receive data from the first inspection device 62 and/or the second inspection device 64 via a portable storage device (e.g., a memory stick, a disk, a CD or DVD, etc.).

Figure 4:
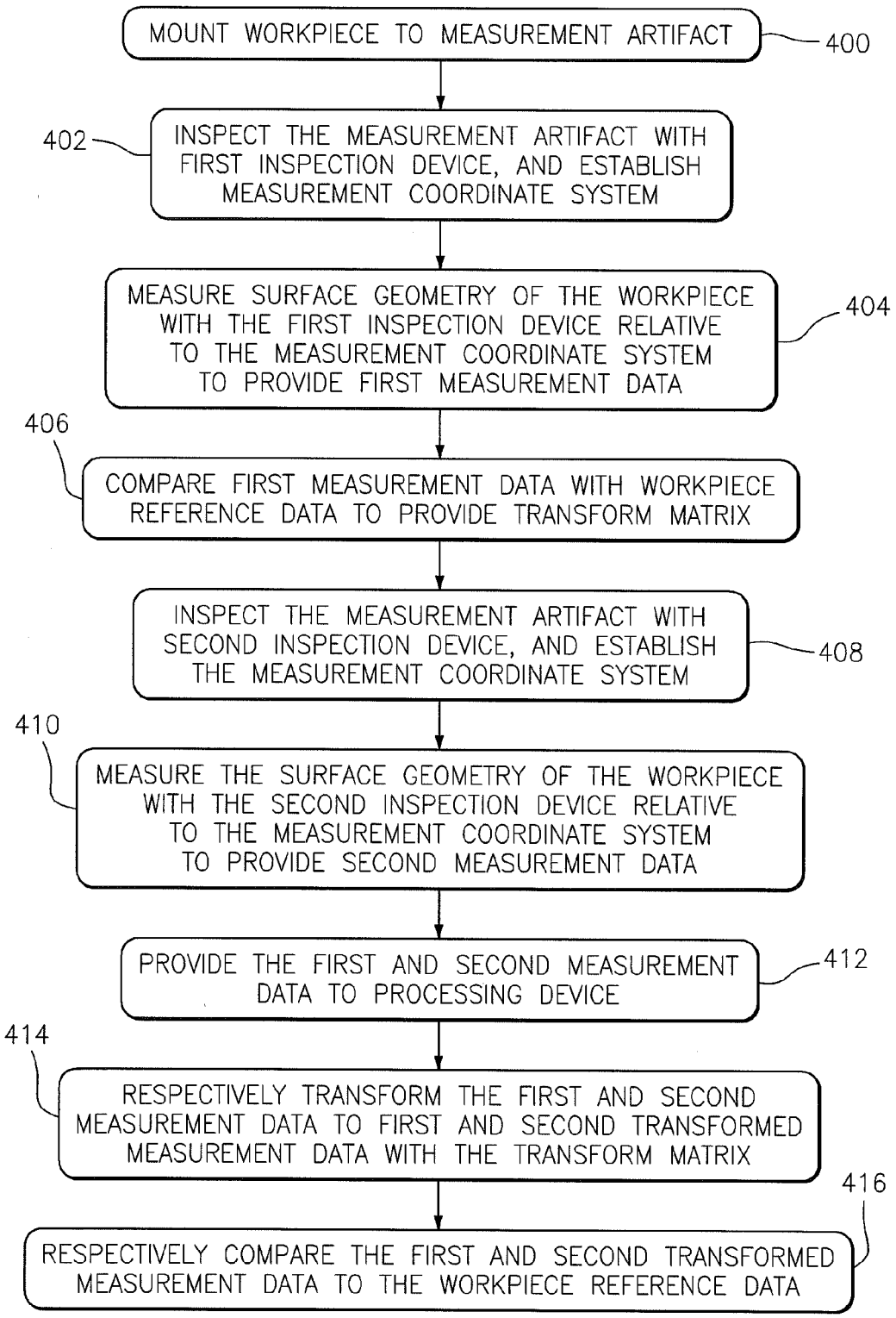
FIG. 4 is a flow diagram of a method for inspecting a workpiece utilizing the measurement artifact illustrated in FIG. 3.

FIG. 4 is a flow diagram of a method for inspecting the workpiece 60 utilizing the measurement artifact 10. Referring to FIGS. 3 and 4, in step 400, the workpiece 60 is mounted to the workpiece mounting surface 48 with, for example, an adhesive material.

In step 402, the first inspection device 62 inspects (e.g., scans) the measurement artifact 10 to establish the measurement coordinate system 50. The first inspection device 62, for example, may optically scan a surface geometry of the measurement artifact 10 to locate the primary datum feature 52, the secondary datum feature 54 and the tertiary datum feature 56. Three measurement data points on the primary datum feature 52 may be collected and processed to establish a primary planar datum. Two measurement data points on the secondary datum feature 54 may be collected and processed to establish a secondary line datum. A plurality of measurement data points on the tertiary datum feature 56 may be collected and processed to establish a tertiary point datum. Three measurement data points on the first notch surface 42, for example, may be collected and processed to establish a first notch plane. Three measurement data points on the second notch surface 44 may be collected and processed to establish a second notch plane. Three measurement data points on the third notch surface 46 may also be collected and processed to establish a third notch plane. A data point where the first notch plane, the second notch plane and the third notch plane intersect may be determined to establish the tertiary point datum. The primary planar datum, the secondary line datum and the tertiary point datum may subsequently be processed, for example using a 3-2-1 alignment procedure, to establish the measurement coordinate system 50. An example of a type of 3-2-1 alignment procedure for establishing a local coordinate system is disclosed in U.S. patent application Ser. No. 11/890,704.

In step 404, the first inspection device 62 measures a surface geometry of the workpiece 60 relative to the measurement coordinate system 50, and provides first measurement data. The first inspection device 62, for example, may project a pattern of alternating parallel light (e.g., white) and dark (e.g., black) lines onto a surface of the workpiece 60. The lines may be distorted by contours, edges and/or other features (e.g., apertures) of the workpiece 60. Images of the lines on the workpiece 60 surface may be captured by the first inspection device 62, and processed to provide a first, surface geometry map of the workpiece 60. The first measurement data may include measurement data points from the first, surface geometry map.

In step 406, the first inspection device 62 (or the processing device 66) compares the first measurement data with workpiece reference (e.g., design-space) data to provide a transform matrix. The workpiece reference data includes measurement data points (e.g., ideal measurements) for the workpiece 60 as it was designed, where the measurement data points are measured relative to a reference (e.g., design-space) coordinate system. Typically the reference coordinate system is different than the measurement coordinate system. The term "transform matrix" is used to describe a matrix that may mathematically transform measurement data that is measured (e.g., aligned) relative to the measurement coordinate system 50 into transformed measurement data that is measured relative to the reference coordinate system. The first inspection device 62, for example, may compare the first measurement data to the workpiece reference data using, for example, a best fit analysis to determine the transform matrix. Examples of commercially available software that may be utilized to determine a transform matrix may include Siemens NX software, Pro-Engineer software, CATIA software, Geomagis Qualify software, Geomagis Studio software, ATOS Inspector software, Tecnomatrix Quality software, Zeiss Calypso software, etc.

In step 408, the second inspection device 64 inspects (e.g., probes) the measurement artifact 10 to establish the measurement coordinate system 50. The second inspection device 64, for example, may contact various points on the measurement artifact 10 with a measurement probe to locate the primary datum feature 52, the secondary datum feature 54 and the tertiary datum feature 56. The second inspection device 64 may subsequently collect and process a plurality of measurement data points for each of the datum features 52, 54 and 56, and may establish the measurement coordinate system 50 using the methodology described above in the step 402.

In step 410, the second inspection device 64 measures the surface geometry of the workpiece 60 relative to the measurement coordinate system 50, and provides second measurement data. The second inspection device 64, for example, may contact various points on the workpiece 60 with the measurement probe to provide a second, surface geometry map of the workpiece 60. The second measurement data may include measurement data points from the second, surface geometry map.

In step 412, the processing device 66 receives the first measurement data from the first inspection device 62, and receives the second measurement data from the second inspection device 64. In step 414, the processing device 66 transforms (e.g., re-aligns) the first measurement data from the measurement coordinate system 50 into the reference coordinate system to provide first transformed measurement data. The processing device 66 also transforms the second measurement data from the measurement coordinate system 50 into the reference coordinate system to provide second transformed measurement data. The processing system, for example, may respectively process the first measurement data and the second measurement data with the transform matrix to provide the first transformed measurement data and the second transformed measurement data.

In step 416, the processing device 66 may respectively compare the first transformed measurement data and the second transformed measurement data to the workpiece reference data. Certain data points from the first transformed measurement data or the second transformed measurement data, for example, may be spatially compared to corresponding data points from the workpiece reference data. This comparison may be indicative of geometric differences between the inspected workpiece 60 and a design-space (e.g., ideal) workpiece. The geometric differences may be analyzed to determine whether the measured dimensions of the workpiece 60 are within tolerance of the geometry designated in the blade design specification.

In some embodiments, the transform matrix may be provided by comparing the second measurement data with the workpiece reference data. In other embodiments, separate transform matrices may be provided for the first measurement data and the second measurement data.

In some embodiments, the first and the second inspection devices may both be non-contact or contact inspection devices. Examples of other types of inspection devices include calipers, advanced topographical optical scanning (ATOS) devices, coordinate measuring machines (CMM), laser scanners, ultrasonic tomography devices, articulating arm CMMs, comparators, etc.

A person of ordinary skill in the art will appreciate that the method steps described above may be performed in a variety of different orders and/or combinations. In some embodiments, for example, each of the first inspection device 62 and/or the second inspection device 64 may scan and measure the measurement artifact 10 and the workpiece 60 concurrently. A person of ordinary skill in the art will also appreciate that one or more of the method steps may be omitted and/or replaced with alternate steps. In some embodiments, for example, the second inspection device 64 may utilize the transform matrix and the measurement coordinate system 50 established in the step 408 to measure the surface geometry of the workpiece 60 at one or more of the same measurement data points used in the step 404. The processing device may subsequently directly compare the measurement data provided by the first inspection device 62 and the second inspection device 64 to verify measurement accuracy between the inspection devices. In this manner, the processing device 66 may simply compare one of the first transformed measurement data and the second transformed measurement data to the workpiece reference data to determine the geometric differences between the inspected workpiece 60 and a design-space workpiece.

FIG. 5 illustrates an alternate embodiment measurement artifact 68. In contrast to the measurement artifact 10 illustrated in FIGS. 1-3, the measurement artifact 68 further includes a substantially spherical body 70 (e.g., a tooling ball) connected to the third notch surface 46. The spherical body 70 may replace the notch 16 as the tertiary datum feature 56 during, for example, the inspection method outlined above in FIG. 3.

FIG. 6 illustrates another alternate embodiment measurement artifact 72. In contrast to the measurement artifact 68 illustrated in FIG. 5, the spherical body 70 included in the measurement artifact 72 is connected to the first end surface 22, for example, adjacent a corner 74 between the first side surface 28 and the fourth side surface 36. The measurement artifact 72 may also omit the notch 16 included in the measurement artifacts 10 and 68 illustrated in FIGS. 1-3 and 5.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined within any one of the aspects and remain within the scope of the invention. Accordingly, the present invention is not to be restricted except in light of the attached claims and their equivalents.

What is claimed is:

1. A method for inspecting a surface geometry of a workpiece, comprising:
   mounting the workpiece to a measurement artifact comprising a plurality of parametric datum features that establish a measurement coordinate system;
   measuring the surface geometry relative to the measurement coordinate system with a first inspection device to provide first measurement data;
   measuring the surface geometry relative to the measurement coordinate system with a second inspection device to provide second measurement data;
   transforming the first measurement data and the second measurement data from the measurement coordinate system into a reference coordinate system to respectively provide first transformed measurement data and second transformed measurement data;
   respectively comparing the first transformed measurement data and the second transformed measurement data to workpiece reference data; and
   comparing the first measurement data with the workpiece reference data to provide a transform matrix, wherein the first measurement data is processed with the transform matrix to provide the first transformed measurement data.

2. The method of claim 1, further comprising:
   inspecting the plurality of parametric datum features with the first inspection device to establish the measurement coordinate system for the measuring with the first inspection device; and
   inspecting the plurality of parametric datum features with the second inspection device to establish the measurement coordinate system for the measuring with the second inspection device.

3. The method of claim 2, wherein
   the inspecting of the plurality of parametric datum features comprises establishing a primary planar datum by inspecting a first of the plurality of parametric datum features, establishing a secondary line datum by inspecting a second of the plurality of parametric datum features, and establishing a tertiary point datum by inspecting a third of the plurality of parametric datum features; and
   the primary planar datum, the secondary line datum and the tertiary point datum establish the measurement coordinate system.

4. The method of claim 1, wherein
   the measurement artifact extends vertically between a planar first end surface and a second end surface, longitudinally between a first side surface and a second side surface, and laterally between a third side surface and a fourth side surface; and a first of the plurality of parametric datum features comprises the first end surface.

5. The method of claim 4, wherein
the measurement artifact further comprises a slot extending longitudinally between the first side surface and the second side surface, the slot comprising a planar first slot surface that extends vertically from a second slot surface to the first end surface, the second slot surface extending laterally from the first slot surface to the third side surface; and
a second of the plurality of parametric datum features comprises the first slot surface.

6. The method of claim 5, wherein
the measurement artifact further comprises a notch comprising a first notch surface, a second notch surface and a third notch surface;
the first notch surface extends vertically from the first end surface to the third notch surface, and longitudinally from the first side surface to the second notch surface;
the second notch surface extends vertically from the first end surface to the third notch surface, and laterally from the fourth side surface to the first notch surface;
the third notch surface extends longitudinally from the first side surface to the second notch surface, and laterally from the fourth side surface to the first notch surface; and
a third of the plurality of parametric datum features comprises the notch.

7. The method of claim 5, wherein
the measurement artifact further comprises a substantially spherical body located adjacent to a corner between the first side surface and the fourth side surface; and
a third of the plurality of parametric datum features comprises the spherical body.

8. The method of claim 4, wherein the measurement artifact further comprises a pocket that extends vertically into the first end surface to a planar workpiece mounting surface.

9. The method of claim 1, wherein the first measurement data is compared with the workpiece reference data using a best fit analysis.

10. The method of claim 1, wherein the second measurement data is processed with the transform matrix to provide the second transformed measurement data.

11. The method of claim 1, wherein the first inspection device comprises an optical white light scanning device, and the second inspection device comprises a coordinate measuring machine.

12. The method of claim 1, wherein the step of measuring the surface geometry relative to the measurement coordinate system with the second inspection device is performed subsequent to the step of measuring the surface geometry relative to the measurement coordinate system with the first inspection device.

13. The method of claim 1, wherein the first inspection device is structurally separate from the second inspective device.

14. A method for inspecting a surface geometry of a workpiece, comprising:
mounting the workpiece to a measurement artifact comprising a plurality of parametric datum features that establish a measurement coordinate system;
measuring the surface geometry relative to the measurement coordinate system with a first inspection device to provide first measurement data;
measuring the surface geometry relative to the measurement coordinate system with a second inspection device to provide second measurement data; and
comparing the first measurement data with the workpiece reference data to provide a transform matrix, wherein the second inspection device measures the surface geometry utilizing the transform matrix.

15. A measurement artifact for establishing a measurement coordinate system during inspection of a workpiece, comprising:
a measurement artifact plate that extends vertically between a planar first end surface and a second end surface, longitudinally between a first side surface and a second side surface, and laterally between a third side surface and a fourth side surface;
a slot that extends longitudinally through the artifact plate between the first side surface and the second side surface, the slot comprising a planar first slot surface that extends vertically from a second slot surface to the first end surface, the second slot surface extending laterally from the first slot surface to the third side surface; and
a notch comprising a first notch surface that extends longitudinally from the first side surface to a second notch surface and vertically from the first end surface to a third notch surface, the second notch surface extending laterally from the fourth side surface to the first notch surface and vertically from the first end surface to the third notch surface, and the third notch surface extending longitudinally from the first side surface to the second notch surface and laterally from the fourth side surface to the first notch surface.

16. The measurement artifact of claim 15, wherein
the first end surface establishes a primary planar datum, the first slot surface establishes a secondary line datum, and the notch establishes a tertiary point datum; and
the primary planar datum, the secondary line datum and the tertiary point datum establish the measurement coordinate system.

17. The measurement artifact of claim 15, further comprising a pocket that extends vertically into the artifact plate from the first end surface to a planar workpiece mounting surface.

18. A measurement artifact for establishing a measurement coordinate system during inspection of a workpiece, comprising:
a measurement artifact plate that extends vertically between a planar first end surface and a second end surface, longitudinally between a first side surface and a second side surface, and laterally between a third side surface and a fourth side surface;
a slot that extends longitudinally through the artifact plate between the first side surface and the second side surface, the slot comprising a planar first slot surface that extends vertically from a second slot surface to the first end surface, the second slot surface extending laterally from the first slot surface to the third side surface; and
a substantially spherical body located adjacent a corner between the first side surface and the fourth side surface;
wherein the first end surface establishes a primary planar datum, the first slot surface establishes a secondary line datum, and the spherical body establishes a tertiary point datum, and the primary planar datum, the secondary line datum and the tertiary point datum establish the measurement coordinate system.

* * * * *